(12) United States Patent
Fulton

(10) Patent No.: US 6,998,800 B2
(45) Date of Patent: Feb. 14, 2006

(54) CURRENT SENSOR FOR DC POWERED THREE PHASE MOTOR CONTROL SYSTEM

(75) Inventor: Donald E. Fulton, Stoneham, MA (US)

(73) Assignee: Kollmorgen Corporation, Northampton, MA (US)

( * ) Notice: Subject to any disclaimer, the term of this patent is extended or adjusted under 35 U.S.C. 154(b) by 269 days.

(21) Appl. No.: 10/655,993

(22) Filed: Sep. 5, 2003

(65) Prior Publication Data

US 2005/0053367 A1 Mar. 10, 2005

(51) Int. Cl.
*H02P 3/18* (2006.01)
(52) U.S. Cl. .................. 318/254; 318/801; 318/805; 318/812; 363/74; 363/95; 363/123
(58) Field of Classification Search ........... 318/138, 318/254, 439, 800, 798, 801, 805, 812; 363/74, 363/79, 95, 97, 123
See application file for complete search history.

(56) References Cited

U.S. PATENT DOCUMENTS

| | | | |
|---|---|---|---|
| 4,496,886 A * | 1/1985 | Gordon et al. ............. 318/254 |
| 4,772,996 A | 9/1988 | Hanei et al. .................. 363/41 |
| 4,804,903 A | 2/1989 | Yundt ......................... 324/130 |
| 5,119,000 A * | 6/1992 | Schultz ....................... 318/254 |
| 5,142,208 A | 8/1992 | Curran et al. ............... 318/254 |
| 5,291,106 A * | 3/1994 | Murty et al. ................ 318/375 |
| 5,719,519 A * | 2/1998 | Berringer .................... 327/423 |
| 5,825,641 A | 10/1998 | Mangtani ..................... 363/98 |
| 5,877,602 A * | 3/1999 | Kondoh et al. ............. 318/254 |
| 5,877,950 A | 3/1999 | Bonsignour et al. .......... 363/98 |
| 6,191,996 B1 | 2/2001 | Yamamoto ............. 365/230.03 |
| 6,301,137 B1 * | 10/2001 | Li .............................. 363/98 |
| 6,529,393 B1 | 3/2003 | Yu .............................. 363/41 |
| 6,654,262 B2 * | 11/2003 | Hussein et al. ............... 363/49 |
| 2003/0006749 A1 | 1/2003 | Rollman .................. 324/76.11 |
| 2003/0048086 A1 | 3/2003 | Takahashi et al. .......... 318/430 |

\* cited by examiner

*Primary Examiner*—Rina Duda
(74) *Attorney, Agent, or Firm*—Withrow & Terranova, PLLC

(57) ABSTRACT

A system is provided for sensing a motor current from a three phase inverter. A first resistor is coupled between a first transistor of the inverter and a supply voltage, and a second resistor is coupled between a second transistor of the inverter and ground. Circuitry coupled to the first and second resistors generates an upper and lower current. When the first transistor is active, the upper current is proportional to the sum of a reference voltage and a voltage across the first resistor, and the lower current is proportional to the reference voltage. When the second transistor is active, the upper current is proportional to the reference voltage, and the lower current is proportional to the sum of the reference voltage and a voltage across the second resistor. Based on the difference of the lower and upper currents, the circuitry provides an output current proportional to the motor current.

50 Claims, 5 Drawing Sheets

CURRENT SENSOR FOR DC POWERED THREE PHASE MOTOR CONTROL SYSTEM

FIELD OF THE INVENTION

The present invention relates sensing the output current of a motor control system, and more particularly relates to sensing the output current of three phase inverters.

BACKGROUND OF THE INVENTION

FIG. 1 illustrates a basic three phase inverter 10. In general, the three phase inverter 10 includes a voltage regulator and isolation circuit 12 connected to the power lines of the power grid and providing isolation from the power grid. Optionally, the voltage regulator and isolation circuit 12 may provide voltage reduction and/or voltage regulation. The voltage regulator 12 generates a direct current (DC) positive supply voltage (+BUS) that is referenced to earth ground (GND). Three "legs" of the three phase inverter 10 are connected between the positive supply voltage (+BUS) and ground (GND). Each of the legs operates to provide one of the three motor currents ($I_{M1}$, $I_{M2}$, $I_{M3}$). Transistors 14 and 16 from the first leg, transistors 18 and 20 form the second leg, and transistors 22 and 24 form the third leg. Each of the transistors 14–24 are controlled by a switching driver 26 such that the three phase inverter 10 generates the three motor currents ($I_{M1}$, $I_{M2}$, $I_{M3}$) that are used to drive a three phase motor.

In order to properly control a three phase motor, it is desirable to sense, or monitor, one or more of the motor currents ($I_{M1}$, $I_{M2}$, $I_{M3}$). In reality, once two of the three motors currents are known, the third motor current can be determined based on Kirchoff's current law which states that the sum of all current flowing into a node is zero, as is well known in the art. Sensing the motor currents with resistors is typically done in one of four ways. A first method places a single resistor between transistors 16, 20, and 24 and ground (GND), thereby sensing one or more of the motor currents. Although simple, this method does not provide enough information to determine each of the motor currents, and is therefore not suitable for high performance motor control.

A second method inserts a first sense resistors between one of the transistors 16, 20, 24 and ground (GND) and a second sense resistor between another of the transistors 16, 20, 24 and ground (GND). However, the motor current only flows in the sense resistors when the respective transistor 16, 20, or 24 is on. Therefore, sampling or estimation techniques must be used, which increases complexity and noise.

A third method inserts a first sense resistor in series with one of the three motor phases and a second sense resistor in series with a second of the three motor phases, such that one of the three motor currents ($I_{M1}$, $I_{M2}$, $I_{M3}$) follows directly through each of the sense resistors. Although this method provides good dynamic control of the motor, a small differential voltage from the sense resistors must be separated from a large AC common mode voltage due to the switching of the transistors 14–24. Circuits capable of rejecting the large AC common mode voltage are relatively expensive and/or large, and are thus less suited for small volume, high performance, motor drives.

A fourth method uses two upper and two lower sense resistors. For example, a first upper sense resistor is placed between transistor 14 and the positive supply voltage (+BUS), and a corresponding first lower sense resistor is placed between the transistor 16 and ground (GND). A second upper sense resistor is placed between the transistor 18 and the positive supply voltage (+BUS), and a corresponding second lower sense resistor is placed between the transistor 20 and ground (GND). The upper sense resistors are used to sense the motor currents ($I_{M1}$, $I_{M2}$) when respectively transistors 14 and 18 are active, and the lower sense resistors are used to sense the motor currents ($I_{M1}$, $I_{M2}$) when respectively transistors 16 and 20 are active. In principal, the sum of the currents through the upper and lower sense resistors in each leg is a continuous output current corresponding to the motor currents. In practice, outputs of the upper sense resistors must be amplified and differentially shifted down to ground where the common mode is rejected and the output of the lower sense resistors are added. Commonly used level shifters are a current mirror or a common base amplifier built with high voltage transistors. These transistors are temperature sensitive. For example, the gain and base to emitter voltage of the transistors varies with temperature. Thus, an offset is introduced into the output signal that varies with temperature. Further, the offset can be a substantial fraction of the maximum sensed signal.

Thus, there remains a need for a system for sensing one or more motors currents from a three phase inverter that avoids the problems of the previous systems, including those described above.

SUMMARY OF THE INVENTION

The present invention provides a system for sensing one or more motor currents generated by a three phase inverter. To sense a first motor current, a first sense resistor is coupled between a first transistor of the three phase inverter and a supply voltage, and a second sense resistor is coupled between a second transistor of the three phase inverter and ground. Circuitry coupled to the first and second sense resistors generates an upper and a lower current. When the first transistor is active and the second transistor is inactive, the upper current is essentially proportional to the sum of a first reference voltage and a voltage across the first sense resistor, and the lower current is essentially proportional to a second reference voltage. When the first transistor is inactive and the second transistor is active, the upper current is essentially proportional to the first reference voltage, and the lower current is essentially proportional to the sum of the second reference voltage and a voltage across the second sense resistor. Based on the difference of the upper and lower currents, the circuitry provides a first output current that is proportional to the first motor current.

In one embodiment, the first output current is digitized by an analog-to-digital (A/D) tracking converter, such as a delta sigma converter. In another embodiment, the system includes second circuitry adapted to sense a second motor current of the three phase inverter and that operates essentially the same as the circuitry described above. In yet another embodiment, the system includes a bias supply circuit that generates the reference voltages, which are essentially the same voltage. Preferably, the bias supply circuit generates each of the reference voltages from a single voltage source.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 2:
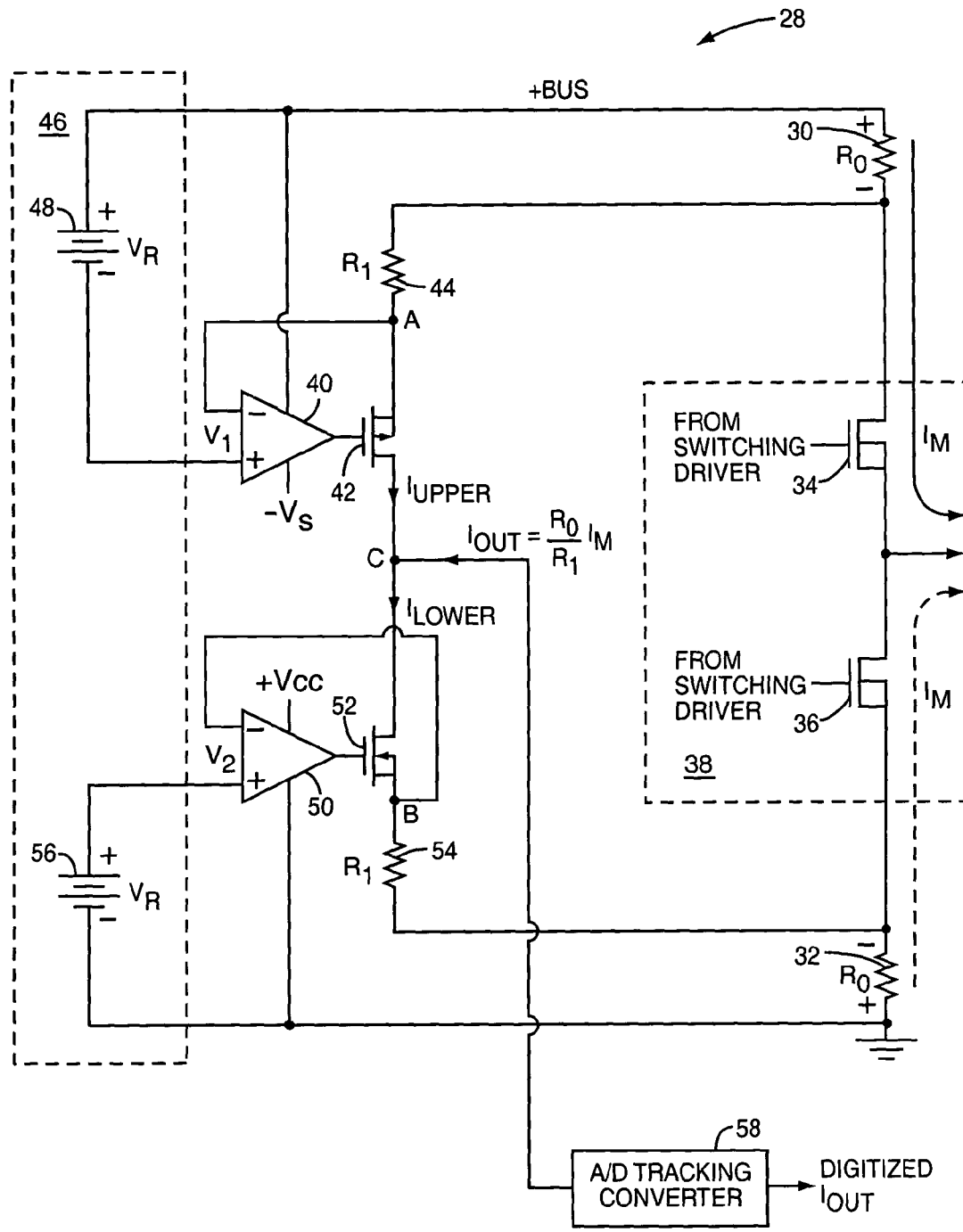
FIG. 2 illustrates a system for continuously sensing a motor current from a three phase inverter according to one embodiment of the present invention.

The description of the present invention begins at FIG. 2 where a system 28 is illustrated for sensing one of three output currents of a three phase inverter according to the present invention. In general, the system 28 includes first and second sensing resistors 30 and 32, respectively, each having a resistance value $R_0$. The first sensing resistor 30 is coupled between the positive supply bus (+BUS) and a first switching transistor 34. The second sensing resistor 32 is coupled between a second switching transistor 36 and ground. The first and second switching transistors 34 and 36 form one leg 38 of a three phase inverter. For simplicity, the entire three phase inverter is not illustrated since it is well known in the art. An example of a three phase inverter is described in U.S. Pat. No. 4,357,655 and is incorporated herein by reference in its entirety.

An upper amplifier 40 and an upper transistor 42 are connected as shown. The upper amplifier 40 and the upper transistor 42 operate as a voltage follower. Preferably, the upper transistor 42 is an P-channel field effect transistor (FET), but should not be limited as such. The upper amplifier 40 and the upper transistor 42 operate to provide a first fixed voltage ($V_1$) to an upper resistor 44 at node A, where the first fixed voltage ($V_1$) is provided by a bias supply circuit 46. In the embodiment of FIG. 2, the first fixed voltage ($V_1$) is the negative terminal of a first voltage source 48. Similarly, a lower amplifier 50 and a lower transistor 52 operate to provide a second fixed voltage ($V_2$) to a lower resistor 54 at node B. The second fixed voltage ($V_2$) is provided by the bias supply circuit 46; and, in the embodiment of FIG. 2, the second fixed voltage ($V_2$) is a voltage $V_R$ from a second voltage source 56. Preferably, the lower transistor 52 is a N-channel field effect transistor (FET), but should not be limited as such. An analog-to-digital (A/D) tracking converter 58 is connected to node C and operates to digitize an output current ($I_{OUT}$), thereby generating a digital representation of the output current (DIGITIZED $I_{OUT}$). The output current ($I_{OUT}$) is directly proportional to the motor current ($I_M$) supplied by the leg 38 of the three phase inverter.

In the embodiment of FIG. 2, each of the upper and lower resistors 44 and 54 have a resistance value of $R_1$, and the resistance $R_0$ of the first and second sensing resistors 30 and 32 is small compared to the resistance $R_1$. For example, the resistance $R_0$ may be 5 milliohms. Preferably, the voltage $V_R$ is larger than the maximum voltage that will appear across the first and second sensing resistors 30 and 32 at maximum motor current ($I_M$) such that the upper and lower transistors 42 and 52 operate linearly and act as current sources.

In operation, the switching transistors 34 and 36 are alternately activated. First we, consider that the second switching transistor 36 is active and the first switching transistor 34 is deactivated. Thus, the motor current ($I_M$) from the leg 38 of the three phase inverter can be defined as flowing from ground through the second switching transistor 36, as illustrated by dashed line. Thus, the current through the lower resistor 54 can be defined as:

$$I_{LOWER} = \frac{V_R}{R_1} + \frac{R_0 I_M}{R_1},$$

where $V_R$ is the reference voltage supplied by the second voltage source 56 and that is provided at node B, $R_1$ is the resistance value of the lower resistor 54, $R_0$ is the resistance value of the second sensing resistor 32, and $I_M$ is the output current of the leg 38 of the three phase inverter. Further, since the resistance $R_0$ of the first sensing resistor 30 is small compared to the resistance $R_1$ of the upper resistor 44, the current through the upper resistor 44 can be defined as:

$$I_{UPPER} = \frac{V_R}{R_1},$$

where $V_R$ is the reference voltage supplied by the first voltage source 48 and $R_1$ is the resistance value of the upper resistor 44.

Thus, according to Kirchoff's current law, the output current ($I_{OUT}$) is:

$$I_{OUT} = I_{LOWER} - I_{UPPER} = \left(\frac{V_R}{R_1} + \frac{R_0 I_M}{R_1}\right) - \frac{V_R}{R_1} = \frac{R_0 I_M}{R_1}.$$

Now we consider when the first switching transistor 34 is active and the second switching transistor 36 is deactivated. Thus, the output current ($I_M$) of the leg 38 of the three phase inverter can be defined as flowing from the positive supply bus (+BUS) through the first switching transistor 34, as illustrated by the solid line. Thus, the current through the upper resistor 44 can be defined as:

$$I_{UPPER} = \frac{V_R}{R_1} - \frac{R_0 I_M}{R_1},$$

where $V_R$ is the reference voltage supplied by the first supply voltage 48, $R_1$ is the resistance value of the upper resistor 44, $R_0$ is the resistance value of the first sensing resistor 30, and $I_M$ is the output current of the leg 38 of the three phase inverter. Further, since the resistance $R_0$ of the second sensing resistor 32 is small compared to the resistance $R_1$ of the lower resistor 54, the current through the lower resistor 54 can be defined as:

$$I_{LOWER} = \frac{V_R}{R_1},$$

where $V_R$ is the reference voltage supplied by the second voltage source 56 and that is provided at node B and $R_1$ is the resistance value of the lower resistor 54. Thus, according to Kirchoff's current law, the output current ($I_{OUT}$) is:

$$I_{OUT} = I_{LOWER} - I_{UPPER} = \frac{V_R}{R_1} - \left(\frac{V_R}{R_1} - \frac{R_0 I_M}{R_1}\right) = \frac{R_0 I_M}{R_1}.$$

Therefore, the system 28 of the present invention provides the output current ($I_{OUT}$) that is a continuous signal and for all states of the first and second transistors 34 and 36 is defined by the equation:

$$I_{OUT} = \frac{R_0 I_M}{R_1}.$$

It should also be noted that when the current motor ($I_M$) from the leg 38 of the three phase inverter changes polarity (flows into the leg 38 rather than out of the leg 38), the polarity of the output current ($I_{OUT}$) will also change, where the output current ($I_{OUT}$) will flow into rather than out of the A/D tracking converter 58.

In general, the system 28 of FIG. 2 produces the digitized output current (DIGITIZED $I_{OUT}$) that is proportional to the motor current ($I_M$) produced by one leg 38 of a three phase inverter. The digitized output current (DIGITIZED $I_{OUT}$) is a continuous representation of the motor current ($I_M$) that is independent of the switching of the transistors 34 and 36 of the leg 38 of the three phase inverter. Further, upon changing the polarity of the motor current ($I_M$), the polarity of the output current ($I_{OUT}$) also changes. In addition, due to the upper and lower symmetry of the system 28 and the fact that the upper and lower currents ($I_{UPPER}$, $I_{LOWER}$) are each generated based on the reference voltage $V_R$, the system 28 does not require level shifting circuitry and the output current ($I_{OUT}$) can be directly digitized by the A/D tracking converter 58.

Figure 1:
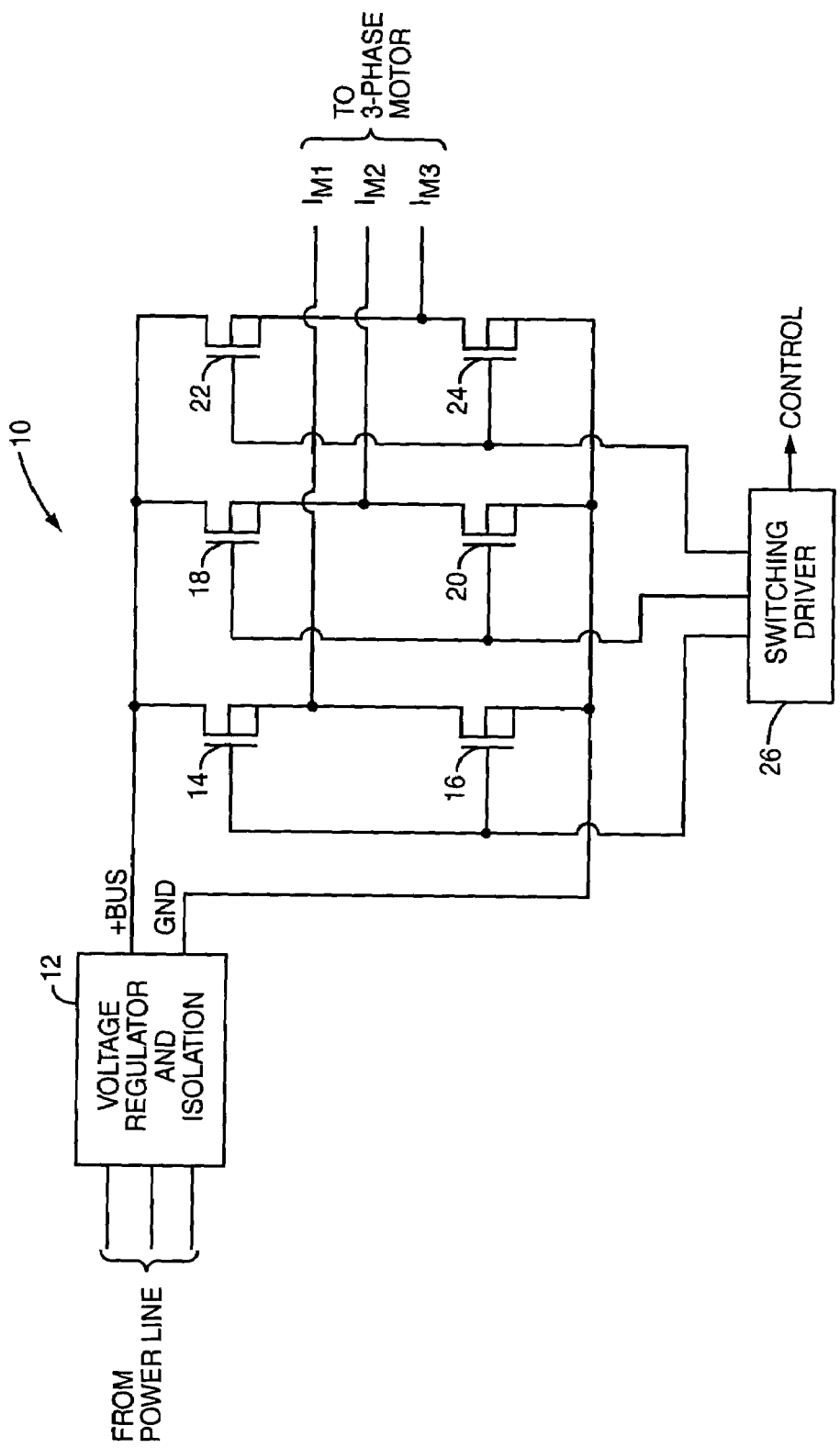
FIG. 1 illustrates a basic three phase inverter in the prior art.
Figure 3:
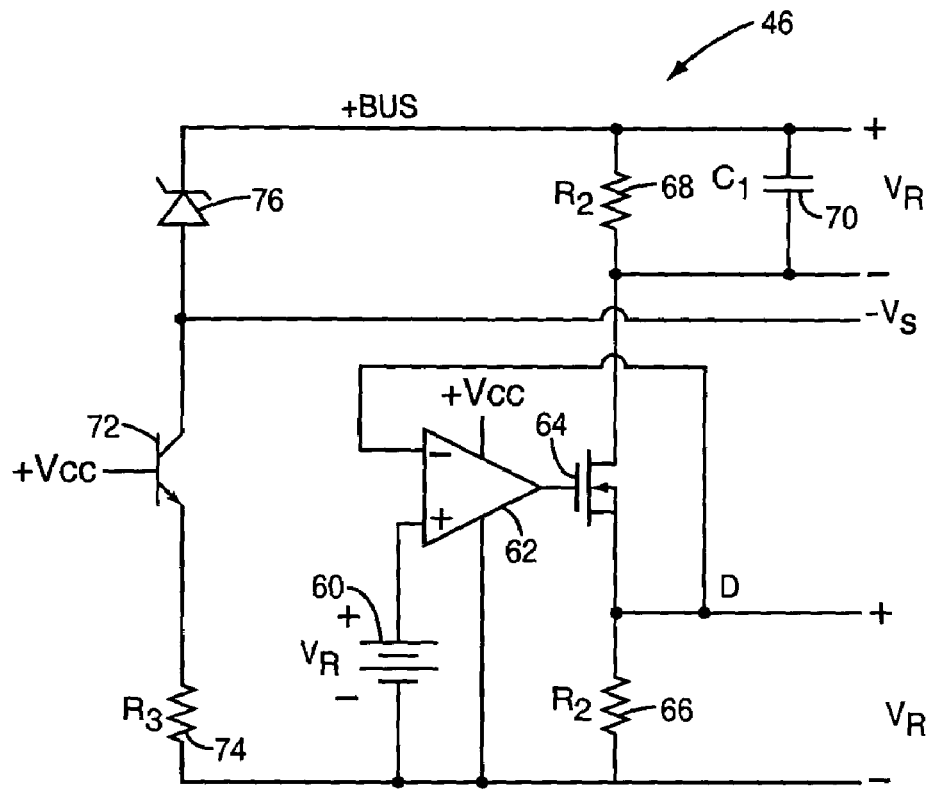
FIG. 3 illustrates one embodiment of a bias supply circuit included in the system of FIG. 2 according to one embodiment of the present invention.

FIG. 3 illustrates one embodiment of the bias supply circuit 46 that may be used to provide the bias supply circuit 46 for the system 28 illustrated in FIG. 2. In this embodiment, a single voltage source 60 is used to generate two separate reference voltages ($V_R$). In general, the bias supply circuit 46 includes an amplifier 62 and transistor 64 connected as shown and operating as a voltage follower. The amplifier 62 and the transistor 64 operate to provide the voltage $V_R$ from the voltage source 60 to resistor 66 at node D, thereby generating the voltage $V_R$ across the resistor 66. Further, by generating the voltage $V_R$ across the resistor 66, a current is induced in resistor 68. Since the resistors 66 and 68 have the same resistance value $R_2$, the voltage $V_R$ is also generated across the resistor 68. The capacitor 70 operates to reduce noise. The bias supply circuit 46 may also include a second transistor 72, resistor 74, and diode 76 arranged as shown to generate a negative supply voltage ($-V_S$) used by the upper amplifier 38 (FIG. 1). In one embodiment, the transistor 72 is a bipolar junction transistor (BJT) and the diode 76 is a zener diode.

The benefit of the bias supply circuit 46 of FIG. 3 is that two voltage references $V_R$ are created from a single voltage source 60. In doing so, the offset of the output current ($I_{OUT}$) is stable. Typically, one source of offset is variation in bias supply circuit 46 due to temperature. By generating both voltage references $V_R$ from a single voltage source 60, both of the voltage references $V_R$ have the same variations due to temperature. Referring to the equations for $I_{OUT}$ above, since the variations for the reference voltages $V_R$ are the same, the $V_R$ terms will cancel. Thus, as long as the voltage references $V_R$ are substantially the same, the output current will not have an offset due to variations in temperature. It should be noted that the embodiment of the bias supply circuit of FIG. 3 is an exemplary embodiment. The bias supply circuit 46 can be any circuit that generates separate reference voltages $V_R$ that are substantially the same voltage over temperature.

Other sources of offset and scale factor drift in the output current ($I_{OUT}$) may exist. However, these offsets are stable and the scale factor is stable due to the tolerances and stability of the resistors 30, 32, 44, and 54 and the stable offset of amplifiers 40 and 50. Use of MOSFET's for transistors 42 and 52 and the inclusion of the transistors 42 and 52 inside the feedback loops of amplifiers 40 and 50, as shown, insures that the transistors 42 and 52 contribute no significant drift in the offset or scale factor. Since stable offsets do not vary with time or temperature, the offset can be determined when both of the transistors 34 and 36 (FIG. 2) are deactivated, where the value of output current ($I_{OUT}$) is essentially the offset. Once the offset is determined, the offset can be subtracted from future values of the output signal ($I_{OUT}$).

Figure 4:
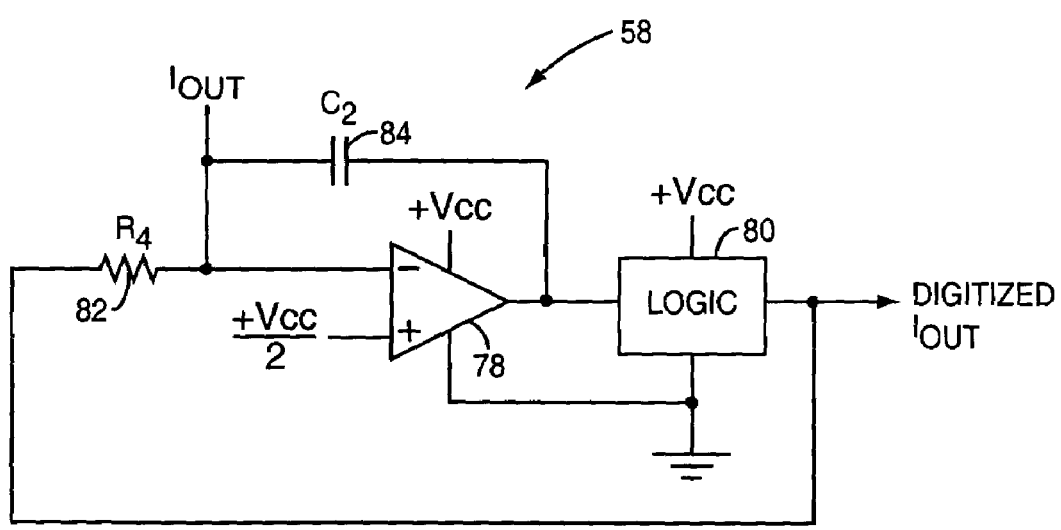
FIG. 4 illustrates one embodiment of an analog-to-digital (A/D) tracking converter included in the system of FIG. 2 according to one embodiment of the present invention.

FIG. 4 illustrates one embodiment of the A/D tracking converter that may be used as the A/D tracking converter 58 in FIG. 2. In general, the converter 58 includes an amplifier 78, logic 80, resistor 82, and capacitor 84 arranged as shown and operating as a delta sigma converter. In one embodiment, the logic 80 is a flip/flop. In operation, the output signal ($I_{OUT}$) is received by an inverting input (−) of the amplifier 78. The digitized output signal (DIGITIZED $I_{OUT}$) from the logic 80 is fed back into the inverting input of the amplifier 78 such that it is subtracted from the output signal ($I_{OUT}$). The difference is integrated by the amplifier 78 and digitized by the logic 80.

Figure 5:
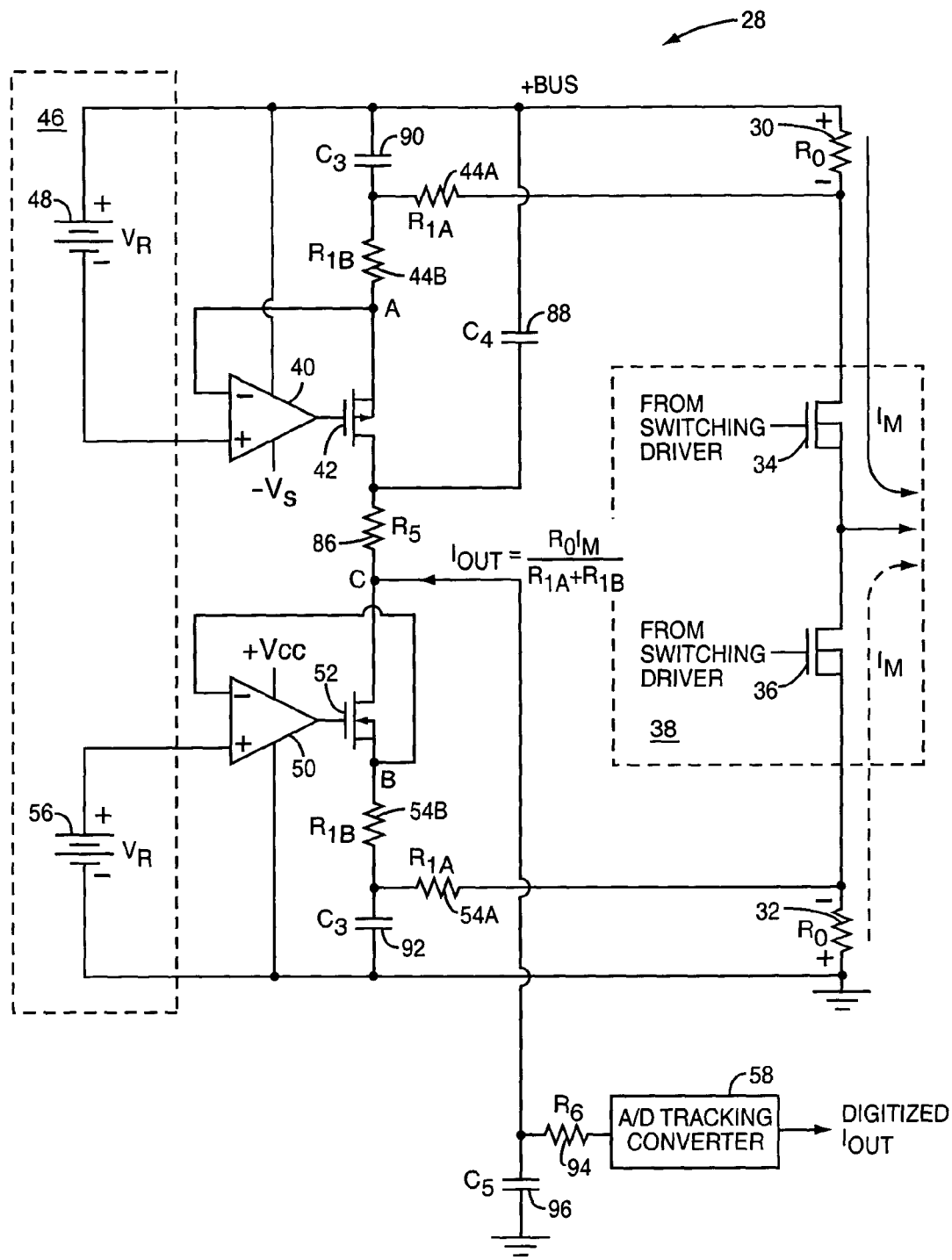
FIG. 5 illustrates the system of FIG. 2 further including filtering circuitry according to another embodiment of the present invention.

FIG. 5 illustrates another embodiment of the system 28. This embodiment is similar to the embodiment illustrated in FIG. 2 and further includes noise filtering. More particularly, resistor 86 and capacitor 88 protect the upper transistor 42 from any high frequency ring voltage that may exist between the positive supply bus (+BUS) and ground, and capacitor 96 and resistor 86 protect the lower transistor 52. Further, the voltage across the current sense resistors 30 and 32 can include fast, high amplitude noise spikes caused by the inductance of the sensing resistors 30 and 32 and reverse recovery currents in the leg 38 of the three phase inverter. The noise spikes can be filtered so the output current ($I_{OUT}$) does not clip. To accomplish this filtering, the upper resistor 44 is split into two resistors 44A and 44B, and capacitor 90 is connected to the positive supply bus (+BUS) as shown. Similarly, the lower resistor 54 is split into two resistors 54A and 54B, and capacitor 92 is connected to ground as shown. Resistor 94 and capacitor 96 may be added to filter high frequencies from the A/D tracking converter 58.

Figure 6:
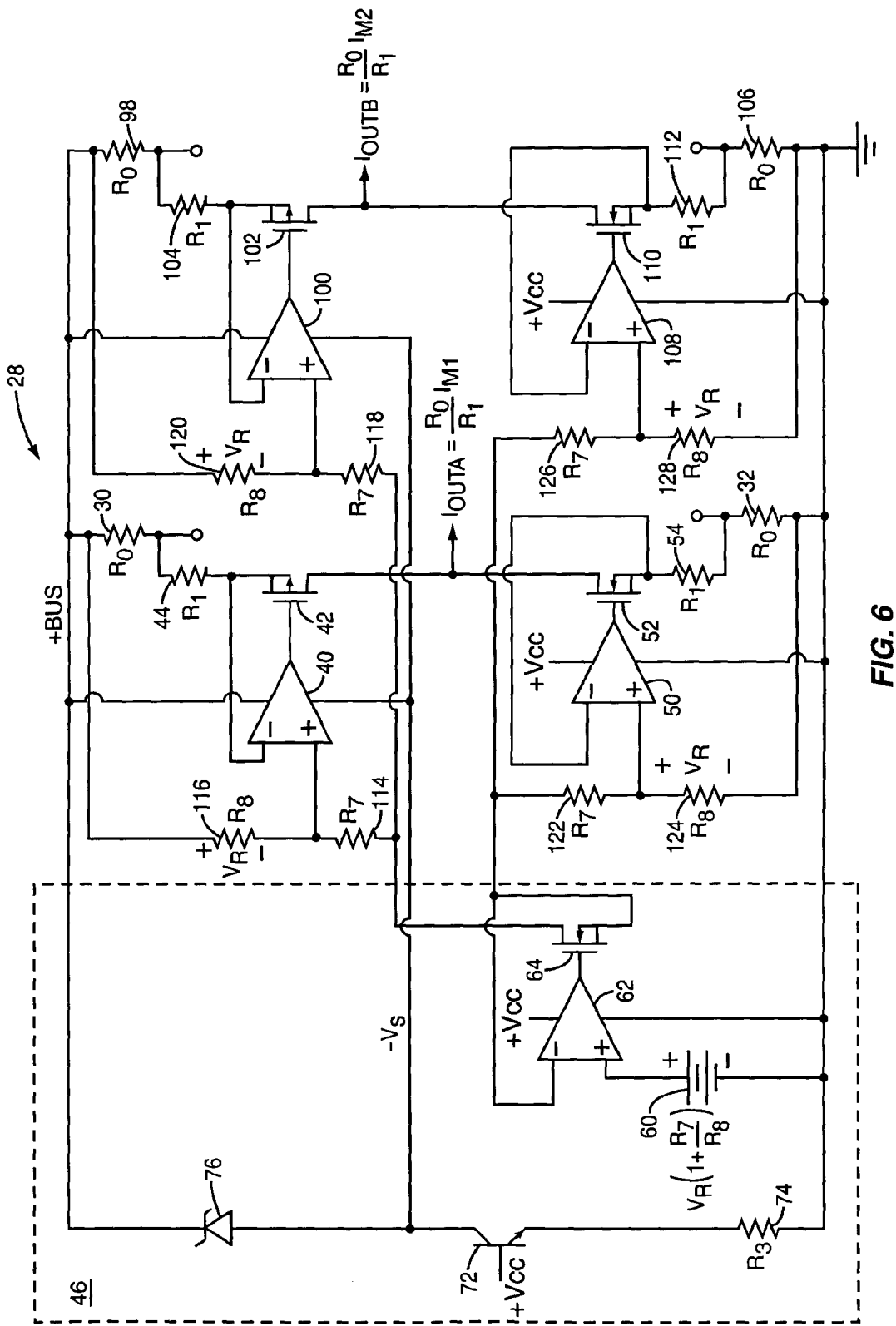
FIG. 6 illustrates a system for sensing two motor currents from a three phase inverter according to another embodiment of the present invention.

FIG. 6 illustrates another embodiment of the system 28 that senses two motor currents ($I_{M1}$ and $I_{M2}$) from two legs of a three phase inverter. Based on the two motor currents ($I_{M1}$, and $I_{M2}$), the third motor current ($I_{M3}$) may be determined based on Kirchoff's current law. The legs of the three phase converter have been omitted for simplicity. In addition, the filtering circuitry of FIG. 5 may be included in this embodiment, but have been omitted for simplicity.

The operation of the system 28 of this embodiment is essentially the same as the operation of the embodiments described above. To sense the second motor current ($I_{M2}$), the system 28 includes sensing resistor 98, amplifier 100, transistor 102, upper resistor 104, sensing resistor 106, amplifier 108, transistor 110, and lower resistor 112 connected as shown. The operation of the sensing resistor 98, the amplifier 100, the transistor 102, and the upper resistor 104 is similar to the operation of the first sensing resistor 30, the upper amplifier 40, the upper transistor 42 and the upper resistor 44 described above. The operation of the sensing resistor 106, the amplifier 108, the transistor 110, and the lower resistor 112 is similar to the operation of the second sensing resistor 32, the lower amplifier 50, the lower transistor 52 and the lower resistor 54 described above.

Resistors 114–128 operate to reduce cross coupling between sensing resistors 30 and 98 and between sensing resistors 32 and 106. Preferably, resistors 114, 118, 122, and 126 have a resistance value $R_7$ that is much larger than a resistance value $R_8$ of the resistors 116, 120, 124, and 128. To accommodate the used of the resistors 114–128, the voltage source 60 of the bias supply circuit 46 produces a voltage equal to $V_R(1+R_7/R_8)$. Thus, the bias supply circuit 46 generates the voltage $V_R$ across the resistors 116, 120, 124, and 128, and the system 28 continues to operate as described above. Accordingly, the first output current ($I_{OUTA}$) corresponds to the first motor current and is defined by the equation:

$$I_{OUTA} = \frac{R_0 I_{M1}}{R_1},$$

and the second output current ($I_{OUTB}$) corresponds to the second motor current and is defined by the equation:

$$I_{OUTB} = \frac{R_0 I_{M2}}{R_1}.$$

By sensing two of the three motors currents supplied by the three phase inverter, the third motor current can be calculated using Kirchoff's current law. It should also be noted that each of the output currents $I_{OUTA}$ and $I_{OUTB}$ are preferably digitized by circuitry such as the A/D tracking converter 58. However, for simplicity, such conversion circuitry has been omitted from FIG. 6.

The present invention provides substantial opportunity for variation without departing from the spirit or scope of the invention. For example, although FIG. 6 illustrates a preferred embodiment of the system 28 for sensing two motor currents, the system 28 of FIG. 1 could be used for each of two or more motor currents. As another example, although transistors 40 and 50 (FIGS. 2, 5, and 6), transistor 64 (FIGS. 3 and 6), and transistors 102 and 110 (FIG. 6) have been illustrates and FETs, other types of transistors or current sources may be used and should be considered within the spirit and scope of the present invention. As yet another example, although one embodiment of the A/D tracking converter 56 is illustrated in FIG. 4, there are numerous variations of the A/D tracking converter 56 that will be obvious to one of ordinary skill in the art and such variations should be considered within the spirit and scope of the present invention. As yet another example, the resistors 114–126 may optionally be included in the bias supply circuit 46.

Those skilled in the art will recognize improvements and modifications to the preferred embodiments of the present invention. All such improvements and modifications are considered within the scope of the concepts disclosed herein and the claims that follow.

What is claimed is:

1. A system for sensing one or more motor currents from a three phase inverter, comprising:
   a first sense resistor coupled between a first switch of a first leg of a three phase inverter and a supply voltage and adapted to sense a first motor current when the first switch is active;
   a second sense resistor coupled between a second switch of the first leg of the three phase converter and ground and adapted to sense the first motor current when the second switch is active; and
   a first circuitry adapted to:
      generate an upper current that is proportional to the difference of a first reference voltage and a voltage across the first sense resistor when the first switch is active, and proportional to the first reference voltage when the first switch is inactive;
      generate a lower current that is proportional to the sum of a second reference voltage and a voltage across the second sense resistor when the second switch is active, and proportional to the second reference voltage when the second switch is inactive, wherein the second reference voltage is essentially the same as the first reference voltage; and
      provide a first output current that is essentially the difference of the lower current and the upper current, thereby providing a first continuous output current that is proportional to the first motor current provided by the three phase inverter.

2. The system of claim 1 wherein the first and second switches of the three phase converter are alternately activated.

3. The system of claim 1 further comprising a bias supply circuit adapted to provide the first and second reference voltages.

4. The system of claim 3 wherein the bias supply circuit is further adapted to provide the first and second reference voltages based on a single voltage source.

5. The system of claim 1 further comprising an analog-to-digital (A/D) tracking converter adapted to digitize the first output signal.

6. The system of claim 5 wherein the A/D tracking converter is a delta sigma converter.

7. The system of claim 1 wherein the first circuitry comprises:
an upper current source comprising:
an upper resistor having first and second terminals, the first terminal coupled to the first sense resistor; and
an upper voltage follower coupled to the second terminal of the upper resistor and adapted to generate a fixed voltage relative to the supply voltage at a first node connecting the upper voltage follower and the upper resistor.

8. The system of claim 7 wherein the first circuitry further comprises:
a lower current source comprising:
a lower resistor having first and second terminals, the first terminal coupled to the second sense resistor; and
a lower voltage follower coupled to the second terminal of the lower resistor and adapted to generate the reference voltage at a second node connecting the lower voltage follower and the lower resistor,
wherein the output current is generated at a third node connecting the upper current source and the lower current source.

9. The system of claim 8 further comprising filtering circuitry adapted to filter high amplitude noise spikes across the first and second sense resistors.

10. The system of claim 9 further comprising second filtering circuitry adapted to protect the upper and lower current sources from high frequency tones.

11. The system of claim 1 wherein the system further comprises:
a third sense resistor coupled between a first switch of a second leg of the three phase inverter and the supply voltage and adapted to sense a second motor current when the first switch of the second leg is active;
a fourth sense resistor coupled between a second switch of the second leg of the three phase converter and ground and adapted to sense the second motor current when the second switch of the second leg is active; and
second circuitry adapted to:
generate an second upper current that is proportional to the difference of a third reference voltage and a voltage across the third sense resistor when the first switch of the second leg is active, and proportional to the third reference voltage when the first switch of the second leg is inactive;
generate a second lower current that is proportional to the sum of a fourth reference voltage and a voltage across the fourth sense resistor when the second switch of the second leg is active, and proportional to the fourth reference voltage when the second switch of the second leg is inactive, wherein the third and fourth reference voltages are essentially the same as the first and second reference voltages; and
provide a second output current that is essentially the difference of the second lower current and the second upper current, thereby providing a second continuous output current that is proportional to the second motor current provided by the three phase inverter.

12. The system of claim 11 wherein the first, second, third, and fourth reference voltages are based on a single voltage source.

13. The system of claim 11 wherein the first and second switches of the second leg of the three phase converter are alternately activated.

14. The system of claim 11 further comprising a first analog-to-digital (A/D) tracking converter adapted to digitize the first output signal and a second A/D tracking converter adapted to digitize the second output signal.

15. The system of claim 14 wherein the first and second A/D tracking converters are delta sigma converters.

16. The system of claim 11 wherein the first circuitry comprises:
a first upper current source comprising:
a first upper resistor having first and second terminals, the first terminal coupled to the first sense resistor; and
a first upper voltage follower coupled to the second terminal of the first upper resistor and adapted to generate a fixed voltage relative to the supply voltage at a first node connecting the first upper voltage follower and the first upper resistor.

17. The system of claim 16 wherein the first circuitry further comprises:
a first lower current source comprising:
a first lower resistor having first and second terminals, the first terminal coupled to the second sense resistor; and
a first lower voltage follower coupled to the second terminal of the first lower resistor and adapted to generate the reference voltage at a second node connecting the first lower voltage follower and the first lower resistor,
wherein the first output current is generated at a third node connecting the first upper current source and the first lower current source.

18. The system of claim 17 wherein the second circuitry comprises:
a second upper current source comprising:
a second upper resistor having first and second terminals, the first terminal coupled to the third sense resistor; and
a second upper voltage follower coupled to the second terminal of the second upper resistor and adapted to generate a fixed voltage relative to the supply voltage at a fourth node connecting the second upper voltage follower and the second upper resistor.

19. The system of claim 18 wherein the first circuitry further comprises:
a second lower current source comprising:
a second lower resistor having first and second terminals, the first terminal coupled to the fourth sense resistor; and
a second lower voltage follower coupled to the second terminal of the second lower resistor and adapted to generate the reference voltage at a fifth node connecting the second lower voltage follower and the second lower resistor,
wherein the second output current is generated at a sixth node connecting the second upper current source and the second lower current source.

20. The system of claim 19 further comprising filtering circuitry adapted to filter high amplitude noise spikes across the first, second, third, and fourth sense resistors.

21. The system of claim 20 further comprising second filtering circuitry adapted to protect the first and second lower current sources and the first and second upper current sources from high frequency tones.

22. A method of sensing one or more motor currents from a three phase inverter, comprising:
providing a first sense resistor between a first switch of a first leg of a three phase inverter and a supply voltage, thereby sensing a first motor current when the first switch is active;

providing a second sense resistor coupled between a second switch of the first leg of the three phase converter and ground, thereby sensing the first motor current when the second switch is active;

generating an upper current that is proportional to the difference of a first reference voltage and a voltage across the first sense resistor when the first switch is active, and proportional to the first reference voltage when the first switch is inactive;

generating a lower current that is proportional to the sum of a second reference voltage and a voltage across the second sense resistor when the second switch is active, and proportional to the second reference voltage when the second switch is inactive, wherein the second reference voltage is essentially the same as the first reference voltage; and providing a first output current that is essentially the difference of the lower current and the upper current, thereby providing a first continuous output current that is proportional to the first motor current provided by the three phase inverter.

23. The method of claim 22 wherein the first and second switches of the three phase converter are alternately activated.

24. The method of claim 22 further comprising the step of providing the first and second reference voltages based on a single voltage source.

25. The method of claim 22 further comprising the step of digitizing the first output current, thereby providing a digitized output current.

26. The method of claim 22 further comprising the steps of:

providing a third sense resistor between a first switch of a second leg of the three phase inverter and the supply voltage, thereby sensing a second motor current when the first switch of the second leg is active;

providing a fourth sense resistor between a second switch of the second leg of the three phase converter and ground, thereby sensing the second motor current when the second switch of the second leg is active;

generating an second upper current that is proportional to the difference of a third reference voltage and a voltage across the third sense resistor when the first switch of the second leg is active, and proportional to the third reference voltage when the first switch of the second leg is inactive;

generating a second lower current that is proportional to the sum of a fourth reference voltage and a voltage across the fourth sense resistor when the second switch of the second leg is active, and proportional to the fourth reference voltage when the second switch of the second leg is inactive, wherein the third and fourth reference voltages are essentially the same as the first and second reference voltages; and providing a second output current that is essentially the difference of the second lower current and the second upper current, thereby providing a second continuous output current that is proportional to the second motor current provided by the three phase inverter.

27. The method of claim 26 wherein the first, second, third, and fourth reference voltages are based on a single voltage source.

28. The method of claim 26 wherein the first and second switches of the second leg of the three phase converter are alternately activated.

29. The method of claim 26 further comprising the step of digitizing the first output signal and the second output signal.

30. A system for sensing one or more motor currents from a three phase inverter, comprising:

a three phase motor adapted to operate based on a first, second, and third motor current;

a three phase inverter having a first leg adapted to generate the first motor current, a second leg adapted to generate the second motor current, and a third leg adapted to generate the third motor current;

a first sense resistor coupled between a first switch of the first leg of the three phase inverter and a supply voltage and adapted to sense the first motor current when the first switch is active;

a second sense resistor coupled between a second switch of the first leg of the three phase converter and ground and adapted to sense the first motor current when the second switch is active; and a first circuitry adapted to:

generate an upper current that is proportional to the difference of a first reference voltage and a voltage across the first sense resistor when the first switch is active, and proportional to the first reference voltage when the first switch is inactive;

generate a lower current that is proportional to the sum of a second reference voltage and a voltage across the second sense resistor when the second switch is active, and proportional to the second reference voltage when the second switch is inactive, wherein the second reference voltage is essentially the same as the first reference voltage; and provide a first output current that is essentially the difference of the lower current and the upper current, thereby providing a first continuous output current that is proportional to the first motor current provided by the three phase inverter.

31. The system of claim 30 wherein the first and second switches of the three phase converter are alternately activated.

32. The system of claim 30 further comprising a bias supply circuit adapted to provide the first and second reference voltages.

33. The system of claim 32 wherein the bias supply circuit is further adapted to provide the first and second reference voltages based on a single voltage source.

34. The system of claim 30 further comprising an analog-to-digital (A/D) tracking converter adapted to digitize the first output signal.

35. The system of claim 34 wherein the A/D tracking converter is a delta sigma converter.

36. The system of claim 30 wherein the first circuitry comprises:

an upper current source comprising:

an upper resistor having first and second terminals, the first terminal coupled to the first sense resistor; and an upper voltage follower coupled to the second terminal of the upper resistor and adapted to generate a fixed voltage relative to the supply voltage at a first node connecting the upper voltage follower and the upper resistor.

37. The system of claim 36 wherein the first circuitry further comprises:

a lower current source comprising:

a lower resistor having first and second terminals, the first terminal coupled to the second sense resistor; and a lower voltage follower coupled to the second terminal of the lower resistor and adapted to generate the reference voltage at a second node connecting the lower voltage follower and the lower resistor, wherein the output current is generated at a third node connecting the upper current source and the lower current source.

38. The system of claim 37 further comprising filtering circuitry adapted to filter high amplitude noise spikes across the first and second sense resistors.

39. The system of claim 38 further comprising second filtering circuitry adapted to protect the upper and lower current sources from high frequency tones.

40. The system of claim 30 wherein the system further comprises:

a third sense resistor coupled between a first switch of the second leg of the three phase inverter and the supply voltage and adapted to sense the second motor current when the first switch of the second leg is active;

a fourth sense resistor coupled between a second switch of the second leg of the three phase converter and ground and adapted to sense the second motor current when the second switch of the second leg is active; and second circuitry adapted to:

generate an second upper current that is proportional to the difference of a third reference voltage and a voltage across the third sense resistor when the first switch of the second leg is active, and proportional to the third reference voltage when the first switch of the second leg is inactive;

generate a second lower current that is proportional to the sum of a fourth reference voltage and a voltage across the fourth sense resistor when the second switch of the second leg is active, and proportional to the fourth reference voltage when the second switch of the second leg is inactive, wherein the third and fourth reference voltages are essentially the same as the first and second reference voltages; and provide a second output current that is essentially the difference of the second lower current and the second upper current, thereby providing a second continuous output current that is proportional to the second motor current provided by the three phase inverter.

41. The system of claim 40 wherein the first, second, third, and fourth reference voltages are based on a single voltage source.

42. The system of claim 40 wherein the first and second switches of the second leg of the three phase converter are alternately activated.

43. The system of claim 40 further comprising a first analog-to-digital (A/D) tracking converter adapted to digitize the first output signal and a second A/D tracking converter adapted to digitize the second output signal.

44. The system of claim 43 wherein the first and second A/D tracking converters are delta sigma converters.

45. The system of claim 40 wherein the first circuitry comprises:

a first upper current source comprising:

a first upper resistor having first and second terminals, the first terminal coupled to the first sense resistor; and a first upper voltage follower coupled to the second terminal of the first upper resistor and adapted to generate a fixed voltage relative to the supply voltage at a first node connecting the first upper voltage follower and the first upper resistor.

46. The system of claim 45 wherein the first circuitry further comprises:

a first lower current source comprising:

a first lower resistor having first and second terminals, the first terminal coupled to the second sense resistor; and a first lower voltage follower coupled to the second terminal of the first lower resistor and adapted to generate the reference voltage at a second node connecting the first lower voltage follower and the first lower resistor, wherein the first output current is generated at a third node connecting the first upper current source and the first lower current source.

47. The system of claim 46 wherein the second circuitry comprises:

a second upper current source comprising:

a second upper resistor having first and second terminals, the first terminal coupled to the third sense resistor; and a second upper voltage follower coupled to the second terminal of the second upper resistor and adapted to generate a fixed voltage relative to the supply voltage at a fourth node connecting the second upper voltage follower and the second upper resistor.

48. The system of claim 47 wherein the first circuitry further comprises:

a second lower current source comprising:

a second lower resistor having first and second terminals, the first terminal coupled to the fourth sense resistor; and a second lower voltage follower coupled to the second terminal of the second lower resistor and adapted to generate the reference voltage at a fifth node connecting the second lower voltage follower and the second lower resistor, wherein the second output current is generated at a sixth node connecting the second upper current source and the second lower current source.

49. The system of claim 48 further comprising filtering circuitry adapted to filter high amplitude noise spikes across the first, second, third, and fourth sense resistors.

50. The system of claim 49 further comprising second filtering circuitry adapted to protect the first and second lower current sources and the first and second upper current sources from high frequency tones.

* * * * *